(12) United States Patent
Leleve et al.

(10) Patent No.: US 6,317,038 B1
(45) Date of Patent: Nov. 13, 2001

(54) INSTALLATION FOR SIGNALLING A MOTOR VEHICLE DECELERATION COMPRISING A LIGHT EMITTING A STEADY LIGHT FLOW

(75) Inventors: Joel Leleve; Jean Rit, both of Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 09/600,505

(22) PCT Filed: Nov. 4, 1999

(86) PCT No.: PCT/FR99/02689

§ 371 Date: Jul. 18, 2000

§ 102(e) Date: Jul. 18, 2000

(87) PCT Pub. No.: WO00/37281

PCT Pub. Date: Jun. 29, 2000

(30) Foreign Application Priority Data

Dec. 21, 1998 (FR) .................................................. 98/16098

(51) Int. Cl.[7] ...................................................... B60Q 1/50
(52) U.S. Cl. ........................ 340/467; 340/468; 340/469; 340/479; 362/543; 362/544; 362/545; 362/800
(58) Field of Search ....................................... 340/467, 463, 340/479, 471, 468, 469; 362/543, 544, 545, 800

(56) References Cited

U.S. PATENT DOCUMENTS 3,501,742 * 3/1970 Ellison .................................. 340/467
5,150,098    9/1992 Rakow .................................. 340/479
5,594,416 * 1/1997 Gerhaher ............................... 340/467
5,828,319 * 10/1998 Tonkin et al. ........................ 340/903
5,896,084 * 4/1999 Weiss et al. .......................... 340/468
6,163,256 * 12/2000 Brown .................................. 340/479

FOREIGN PATENT DOCUMENTS 32 20 442    4/1983  (DE) .
195 36 627   3/1997  (DE) .
2 536 710    6/1984  (FR) .

OTHER PUBLICATIONS

International Search Report dated Jan. 18, 2000.

* cited by examiner

Primary Examiner—Julie Lieu
(74) Attorney, Agent, or Firm—Morgan & Finnegan, LLP

(57) ABSTRACT

The invention relates to an installation for signalling the deceleration of a motor vehicle. It comprises a signal lamp having an illuminating area divided into luminous sections, each equipped with its own light source, and means for controlling the lighting of a number of light sources which increases with the deceleration of the vehicle. The luminous intensity of the illuminating area remains substantially constant whatever the number of lighting sections lit. This constant intensity can be obtained by supplying the light sources with substantially constant power. The means for controlling the lighting of the light sources comprise a deceleration sensor and connection means which selectively link the light sources to an electrical-energy source as a function of an output signal from the sensor.

18 Claims, 2 Drawing Sheets

INSTALLATION FOR SIGNALLING A MOTOR VEHICLE DECELERATION COMPRISING A LIGHT EMITTING A STEADY LIGHT FLOW

BACKGROUND OF THE INVENTION

The invention relates to an installation for signalling the deceleration of a motor vehicle, comprising a signal lamp having an illuminating area which lights up in the event of deceleration of the vehicle, this illuminating area being divided into lighting sections, each section being equipped with its own light source, and means for controlling the lighting of a number of light sources which increases with the deceleration of the vehicle so as to obtain a lit surface of the illuminating area representative of this deceleration.

The stop lamps placed at the rear of a vehicle light up when the brake pedal is actuated. They thus allow the driver of a following vehicle to anticipate a slowing-down and to react to it. In contrast, these lamps give no information on the strength of the braking. For this reason stop lamps have been envisaged (DE 195 06 621), particularly complementary lamps, the illuminating area of which is divided into a certain number of sections. The greater the deceleration of the vehicle, the higher the number of sections lit up. The surface of the illuminating area increases in size as a function of the deceleration and thus supplies an indication representative thereof. This allows the driver of a following vehicle to be informed as to the strength of the braking.

However, in a known lamp of this type, each section of the illuminating area emits a luminous flux of constant intensity. The overall intensity of the lamp is thus equal to the arithmetic sum of the intensities of each of the sections, such that it varies very greatly. It is a minimum when only one section is lit and a maximum when all the sections are. However, the luminous intensity of the lamp should not exceed a maximum value fixed by the regulations. If this value is not exceeded when all the sections are lit, the lamp will be difficult to discern when only one single section is lit since its luminous intensity will be weak. If the luminous intensity of a single section is sufficient to be discerned clearly, the amplitude of the variation of the signal, proportional to the total number of sections of the lamp, will have to be low so that the intensity of the lamp does not exceed the maximum value when all the sections are lit. Hence the known lamps do not make it possible fully to transmit a signal representative of the deceleration, which has the outcome either of late braking by the following vehicle, or of over-braking followed by acceleration.

BRIEF SUMMARY OF THE INVENTION

The precise subject of the invention is an installation for signalling the deceleration of a motor vehicle which remedies these drawbacks. It should make it possible to deliver a signal representative of the deceleration which can vary by a large amplitude while being perceptible at low deceleration, and do so without the intensity of the lamp exceeding the regulatory standards when the lamp is fully lit.

This result is achieved, in accordance with the invention, by the fact that the luminous intensity of the illuminating area remains substantially constant whatever the number of lighting sections lit.

The constant luminous intensity of the illuminating area is preferably obtained by supplying the light sources with substantially constant power.

By virtue of this characteristic, the lamp delivers a signal which can vary by a large amplitude while being perceptible even for a slight deceleration, this being so without the intensity of the lamp exceeding the regulatory standards when the lamp is fully lit.

According to one particular embodiment, the light sources are such that the voltage at their terminals is largely independent of the strength of the current which is passing through them, the substantially constant luminous intensity of the illuminating area being obtained by supplying the light sources with an electric current of substantially constant strength. These light sources consist, for example, of a plurality of light-emitting diodes.

The means for controlling the lighting of a number of light sources which increases with the deceleration of the vehicle preferably comprise a deceleration sensor which measures the deceleration of the vehicle, and connection means which selectively link the light sources to an electrical-energy source as a function of an output signal from the deceleration sensor.

The connection means preferably comprise, for each light source, a transistor mounted on the circuit for supplying power to the source and a comparator, receiving an output signal from the deceleration sensor and linked to the transistor, which changes over when the output signal from the deceleration sensor becomes higher than a reference voltage, which makes the transistor conduct.

BRIEF DESCRIPTION OF THE DRAWINGS

Other characteristics and advantages of the present invention will emerge further on reading the description which follows of embodiment examples described by way of illustration, by reference to the attached figures. In these figures.

DETAILED DESCRIPTION OF THE INVENTION

Figure 1:
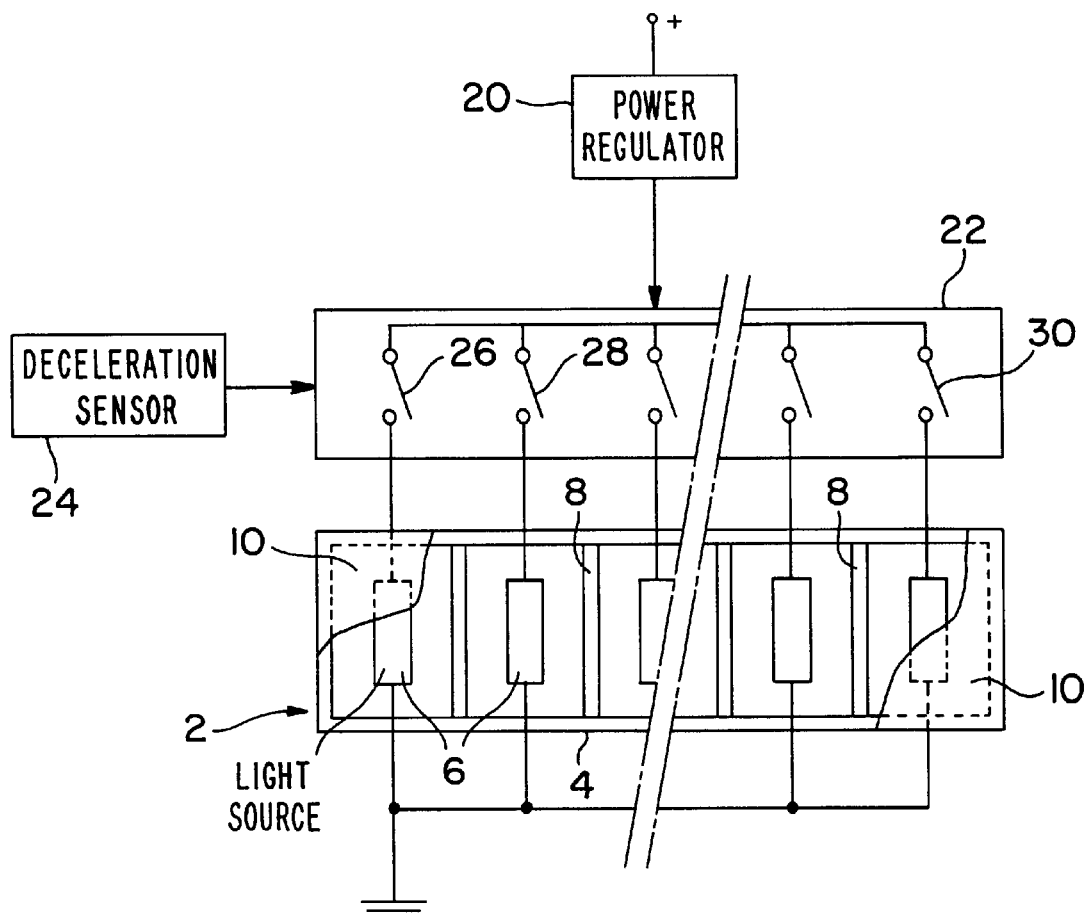
FIG. 1 is a diagrammatic view of an installation in accordance with the invention.

In FIG. 1, the signal lamp 2 comprises a housing 4 which encloses a certain number of light sources 6. Each light source may consist of a single lamp, for example a neon tube, or of a series of lamps, for example a series of light-emitting diodes. The light sources 6 are separated by partitions 8 which divide the internal space of the housing 4 into as many sections as there are light sources. The overall illuminating area of the lamp 2, formed by a bezel 10 which closes the housing, is therefore divided into a number of sections equal to that of the light sources.

The light sources 6 are linked to a source of electric current via means which make it possible for the luminous intensity of the illuminating area to remain constant whatever the number of lighting sections lit. In the example represented, these means consist of a power regulator 20 which delivers a constant power. The regulator is linked to connection means 22 which selectively link the light sources to the electrical-energy source as a function of the output signal delivered by the deceleration sensor 24. When the deceleration is slight, the connection means close only the switch 26 so that only the first section of the illuminating area is lit up. If the deceleration increases, then it is switch 28 which is closed, which lights up the second section, and so on up to switch 30. At that time, the whole of the lamp 2 is lit up. The lit surface of the illuminating area is therefore a function of the deceleration. It may be proportional to this deceleration, for example. The lamp thus supplies information representative of the deceleration, which allows a following vehicle to react to it under the best conditions. Moreover, however, the luminous power of the lamp remains substantially equal whatever the number of illuminating sections lit by virtue of the presence of the power regulator. When only one light source is powered, it absorbs all the power supplied by the regulator 20. When two light sources are powered, the power is distributed over these two sources. And when all the light sources are powered, the power is distributed over all the light sources. Hence the luminous power of the lamp remains substantially constant. By virtue of this characteristic, the surface of the illuminating area may vary by a large amplitude between the two extremes, namely a slight slowing (a single section lit) and emergency braking (lamp entirely lit), and do so without exceeding the limits fixed by the regulatory standards.

Figure 2:
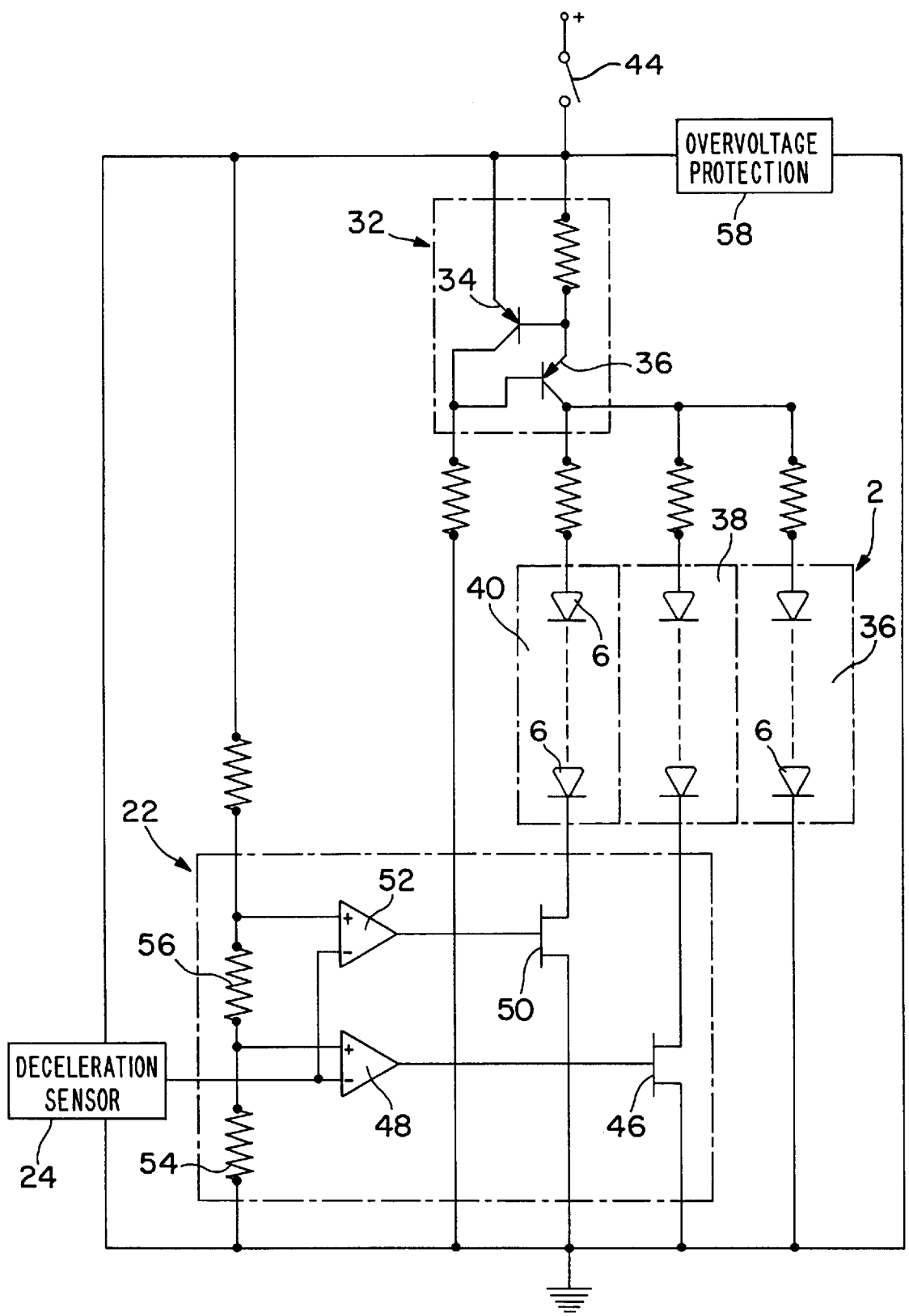
FIG. 2 is a view of a preferred embodiment of the invention.

The electronic diagram of a preferred embodiment of the invention has been represented in FIG. 2. In this embodiment, each light source consists of a series of light-emitting diodes. As is known, the voltage at the terminals of the light-emitting diodes is substantially constant (to within 20%), as a function of the strength of the current which passes through them. It is therefore possible to carry out fairly satisfactory power regulation by regulating only the strength of the current absorbed by the diodes. A current regulator 32 is formed by the two transistors 34 and 36.

A lamp 2 which includes only three sections has been represented in the figure, but this number could naturally be much higher. One of the lighting sections, called first section 36, is linked directly to the source of electric current, without passing through the connection means 22. It lights up as soon as the switch 44, actuated by the brake pedal (not represented), is closed, independently of the value of the deceleration. The other sections 38 and 40 light up as a function of the output signal from the deceleration sensor 24. In a variant embodiment, the information accessible on a network carrying information in multiplexed form can be used in place of the deceleration sensor.

The connection means 22 comprise a transistor 46 and a comparator 48 for the second illuminating section 38, and a transistor 50 and a comparator 52 for the third illuminating section 40. The second illuminating section 38 lights up when the output signal from the deceleration sensor 24 is above a reference voltage given by the resistor 54. The transistor 46 becomes conducting, which connects the light source 6 of the second section 38 to the source of electric current and lights up this light source.

If the deceleration increases further, the output signal from the deceleration sensor 24 increases and goes above a higher reference voltage given by the resistors 54 and 56. The transistor 52 [sic} becomes conducting which connects the light source 6 of the third section 40 to the source of electric current and lights up this section. The lamp is thus completely lit.

The installation further includes, conventionally, a protection 58 against overvoltages. The resistors in the power-supply Lines of each of the sections serve to balance the current in the light-emitting diodes.

Figure 3:
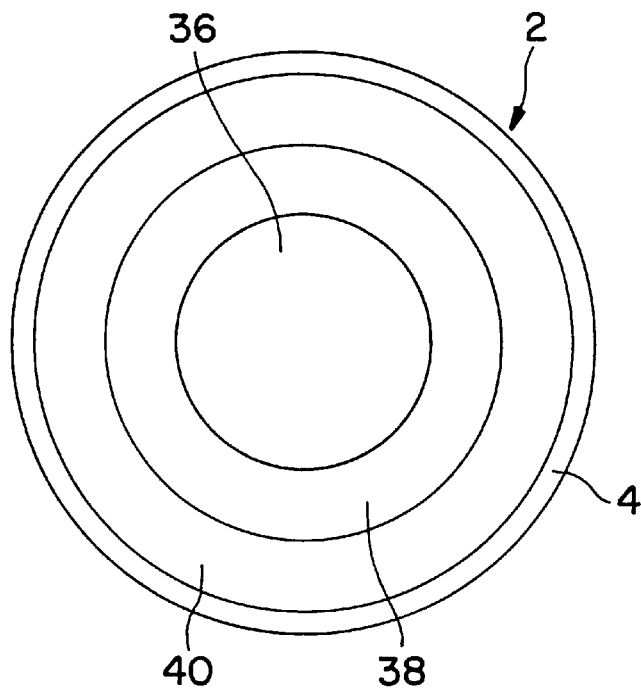
FIG. 3 represents a signal lamp in which the lighting sections are arranged concentrically.

Another possible configuration of the illuminating sections has been represented in FIG. 3. The lamp 2 is circular, and it is divided into concentric sections. The lamp can be designed in such a way that the central section 36 lights up first, then the sections 38 and 40. Or, conversely, the section 40 may light up first, then the section 38 and finally the central section 36, the luminous intensity of the lamp remaining substantially constant in all cases.

What is claimed is:

1. An installation for signalling the deceleration of a motor vehicle, comprising a signal lamp having an illuminating area which lights up in the event of deceleration of the vehicle, this illuminating area being divided into lighting sections, each section being equipped with its own light source, and means for controlling the light of a number of light source, and means for controlling the lighting of a number of light sources which increases with the deceleration of the vehicle so as to obtain a lit surface of the illuminating area representative of this deceleration, wherein the luminous intensity of the illuminating area remains substantially constant whatever the number of lighting sections lit.

2. An installation according to claim 1, wherein the constant luminous intensity of the illuminating area is obtained by supplying the light sources with substantially constant power.

3. An installation according to claim 1, wherein the light sources are such that the voltage at their terminals is largely independent of the strength of the current which is passing through them, the constant luminous intensity of the illuminating area being obtained by supplying the light sources with an electric current of constant strength.

4. An installation according to claim 3, wherein the light sources consist of a plurality of light-emitting diodes.

5. An installation according to claim 1, wherein the means for controlling the lighting of a number of light sources which increases with the deceleration of the vehicle preferably comprise a deceleration sensor which measures the deceleration of the vehicle, and connection means which selectively link the light sources to an electrical-energy source as a function of an output signal from the deceleration sensor.

6. An installation according to claim 5, wherein the connection means comprise, for at least one light source, a transistor mounted on the circuit for supplying power to the source and a comparator, receiving an output signal from the deceleration sensor and linked to the transistor, which changes over when the output signal from the deceleration sensor becomes higher than a reference voltage, which makes the transistor conduct.

7. An installation according to claim 2, wherein the light sources are such that the voltage at their terminals is largely independent of the strength of the current which is passing through them, the constant luminous intensity of the illuminating area being obtained by supplying the light sources with an electric current of constant strength.

8. An installation according to claim 2, wherein the means for controlling the lighting of a number of light sources which increases with the deceleration of the vehicle preferably comprise a deceleration sensor which measures the deceleration of the vehicle, and connection means which selectively link the light sources to an electrical-energy source as a function of an output signal from the deceleration sensor.

9. An installation according to claim 3, wherein the means for controlling the lighting of a number of light sources which increases with the deceleration of the vehicle preferably comprise a deceleration sensor which measures the deceleration of the vehicle, and connection means which selectively link the light sources to an electrical-energy source as a function of an output signal from the deceleration sensor.

10. An installation according to claim 4, wherein the means for controlling the lighting of a number of light sources which increases with the deceleration of the vehicle preferably comprise a deceleration sensor which measures the deceleration of the vehicle, and connection means which selectively link the light sources to an electrical-energy source as a function of an output signal from the deceleration sensor.

11. A method of signaling deceleration of a motor vehicle, comprising:

selectively controlling a lighting of a number of light sources to selectively illuminate sections of an illuminating area according to an amount of deceleration of a motor vehicle;

maintaining a luminous intensity of the illuminating area at a substantially constant intensity irrespective of a number of sections illuminated.

12. The method according to claim 11, wherein the constant luminous intensity of the illuminating area is obtained by supplying the light sources with substantially constant power.

13. The method according to claim 11, wherein a voltage at terminals of the light sources is substantially independent of a strength of current passing therethrough, the constant luminous intensity of the illuminating area being obtained by supplying the light sources with an electric current of constant strength.

14. The method according to claim 13, wherein the light sources comprises a plurality of light-emitting diodes.

15. The method according to claim 11, wherein the controlling comprises:

measuring the deceleration of the vehicle; and selectively linking the light sources to an electrical-energy source as a function of the measured deceleration.

16. The method according to claim 15, wherein the linking comprises connecting a light source of the light sources to a power supply via a transistor, the transistor being conductive to enable supply of power to the power source if the measured deceleration exceeds a predetermined value.

17. The method according to claim 11, wherein the number of light sources illuminated increases with increased deceleration of the motor vehicle.

18. The method according to claim 11, wherein the plurality of illuminating sections are arranged concentrically.

* * * * *